US006882395B2

(12) United States Patent
Liu

(10) Patent No.: US 6,882,395 B2
(45) Date of Patent: Apr. 19, 2005

(54) WIDE VIEWING ANGLE FRINGE FIELD MULTI-DOMAIN ALIGNED LCD WITH ELECTRICALLY CONDUCTIVE GRIDS AND METHOD FOR FABRICATING

(75) Inventor: Hong-Da Liu, Hsin chu (TW)

(73) Assignee: Industrial Technology Research Institute, Chutung (TW)

( * ) Notice: Subject to any disclaimer, the term of this patent is extended or adjusted under 35 U.S.C. 154(b) by 46 days.

(21) Appl. No.: 10/037,847

(22) Filed: Oct. 19, 2001

(65) Prior Publication Data

US 2003/0076469 A1 Apr. 24, 2003

(51) Int. Cl.[7] .............................................. G02F 1/1343
(52) U.S. Cl. ....................................... 349/141; 349/129
(58) Field of Search ................................. 349/141, 129

(56) References Cited

U.S. PATENT DOCUMENTS 5,995,182 A * 11/1999 Watanabe et al. ........... 349/110
6,027,665 A * 2/2000 Pausch et al. ......... 252/299.61
6,088,078 A * 7/2000 Kim et al. .................. 349/141
6,128,061 A * 10/2000 Lee et al. ................... 349/141
6,335,770 B1 * 1/2002 Komatsu ..................... 349/38
6,335,776 B1 * 1/2002 Kim et al. .................. 349/129
6,469,764 B1 * 10/2002 Kim et al. .................. 349/141
6,469,765 B1 * 10/2002 Matsuyama et al. ........ 349/143
6,650,390 B1 * 11/2003 Sakamoto et al. .......... 349/143

* cited by examiner

*Primary Examiner*—Robert H. Kim
*Assistant Examiner*—Andrew Schechter
(74) *Attorney, Agent, or Firm*—Shaw Pittman LLP

(57) ABSTRACT

A wide viewing angle fringe field multi-domain vertically aligned LCD panel and a method for fabricating the panel are disclosed. The LCD panel can be constructed by a first light-missive transmissive substrate, an electrically conductive layer coated on an inside surface of the first light-transmissive substrate to form a first electrode, the layer is substantially optically transparent; a second light transmissive substrate; and electrically conductive grid of horizontal and vertical bars coated on an inside surface of the second light-transmissive substrate to form a second electrode; a cavity formed between the two inside surfaces of the first and second light transmissive substrates and a peripheral seal when the two substrates are positioned together in a spaced-apart relationship; and a liquid crystal material filling the cavity.

6 Claims, 6 Drawing Sheets

WIDE VIEWING ANGLE FRINGE FIELD MULTI-DOMAIN ALIGNED LCD WITH ELECTRICALLY CONDUCTIVE GRIDS AND METHOD FOR FABRICATING

FIELD OF THE INVENTION

The present invention generally relates to a liquid crystal display panel and a method for fabricating the panel and more particularly, relates to a wide viewing angle fringe field multi-domain aligned liquid crystal display panel and a method for fabricating the panel.

BACKGROUND OF THE INVENTION

Liquid crystal display devices have been used for many years. In the beginning, their uses have been concentrated in small appliance applications such as electronic watches and calculators. LCD's are now used in applications for instrument panel numerical displays and graphical displays. Advantages presented by LCD's are their inherent properties of small thickness, lightweight, low driving voltage required and low power consumption. As a consequence, more recent applications of color LCD's can be found in small screen television sets, notebook computer display panels and video camera view finders as replacements for conventional CRT's.

A liquid crystal display device can be made either a color unit or a black and white unit. The device may also be constructed as a reflective-type or as a transmissive type, depending on the light source used. Since liquid crystal molecules respond to an externally applied electrical voltage, liquid crystals can be used as an optical switch or as a light valve. A typical liquid crystal display cell arrangement is shown in FIGS. 1A and 1B.

Referring initially to FIG. 1A, wherein a liquid crystal display device 10 is shown. Liquid crystal display cell 10 is a single pixel which is constructed by two parallel glass plates, i.e. an upper plate 12 and a lower plate 14. Both the upper plate 12 and the lower plate 14 have a polarizing film 36 and 32 coated on its outer surface. The cavity 18 formed between the two plates 12 and 14 is filled with a liquid crystal material 20. One of the most commonly used liquid crystal material is of the twisted nematic (TN) type wherein the term twist refers to the tendency of the liquid crystal to form chains that rotate from one side 22 of the gap between the plates to the other side 24 of the gap. The degree of rotation can be controlled during the fabrication process.

As shown in FIG. 1A, light beam 28 passes through the polarizer 36 and then through the liquid crystal display cell 10 having its polarization direction rotated by following the physical rotation of the liquid crystal molecules 26. As shown in this simplified illustration, the polarizer 32 on the exit side 24 of the liquid crystal cell 10 is positioned such that it allows a rotated light beam 30 to pass through the polarizer 32. When viewed from the side of the polarizer 32, the pixel of the liquid crystal cell 10 thus appears clear, i.e. in a transmitting mode.

A transparent electrical conductor (not shown) such as indium-tin-oxide (ITO) is normally deposited on the inner surfaces of the glass plates 12 and 14. When a voltage is applied across the cell cavity 18 by addressing an appropriate line formed on each side of the cell, the liquid crystal molecules 26 reorient themselves to follow the applied electric field. The liquid crystal materials 26 are thus untwisted as shown in FIG. 1B. The passage of the untwisted light beam 34 is blocked by the exit polarizer 32 as long as the voltage is present. When the voltage is turned off (shown in FIG. 1A), the liquid crystal molecules 26 returns to their original state and the cell or the pixel becomes clear again. As previously stated, typical voltages and currents required to activate the liquid crystal molecules are relatively low making it an ideal candidate for incorporation in battery-operated equipment where low power consumption is essential. A typical twisted nematic (TN) liquid crystal cell used for small displays have a twist angle of 90°. More recently developed super twisted nematic (STN) material forms a twist angle up to 270° and thus allow higher contrast so that many pixel elements can be multiplexed in a single display.

While the liquid crystal display device 10 shown in FIGS. 1A and 1B is the transmissive type, liquid crystal display devices of the reflective-type are also used. In a reflective-type liquid crystal display device, one of the upper plate 12 and the lower plate 14 (shown in FIG. 1A) is replaced by a reflector plate which is light reflective and not transmissive. The reflector plate may be fabricated of a glass substrate with transistors or other active components built on top and coated with a metal reflective layer. In the reflective-type liquid crystal display device, the light source for illuminating the liquid crystal display is from the ambient such that a display is viewed in a reflective manner.

A drawback of the reflective-type liquid crystal display device is the noise signals reflected from the top, or the cover glass plate of the display device. In a conventional reflective type liquid crystal display device, the reflector plate and the top cover plate are parallel to each other. When an outside light source is used to produce an image in the liquid crystal device under the reflective principal, the light reflected from the reflector plate and from the top plate have the same reflective angle. Since the light reflected from the top cover plate does not produce the image formed in the liquid crystal display, only noise signals are produced with decrease the contrast of the display device. Furthermore, the noise/signal ratio of the device is also increased which affect the quality of images produced by the display device.

In recent years, the liquid crystal display panels have been more widely used in replacing the traditional CRTs in the electronics industry, and specifically, for the computer industry. In order for the LCD to completely replace the CRTs, various characteristics of the LCD panel must be improved which includes a wide viewing angle, better color definition and improved image clarity. At the present time, the twisted nematic LCDs are the most frequently used in the electronic and computer industry. Various efforts have been made on the improvement of viewing angles of the twisted nematic display panels, however, improvements are still needed in the color definition, in its dependence on the viewing position change and in the brightness uniformity when the liquid crystals are activated.

It is therefore an object of the present invention to provide a wide viewing angle LCD panel that does not have the drawbacks or shortcomings of the conventional LCD panels.

It is another object of the present invention to provide a wide viewing angle fringe field multi-domain aligned LCD that has significantly improved performance characteristics when compared to conventional LCDs.

It is a further object of the present invention to provide a wide viewing angle fringe field multi-domain aligned LCD that utilizes grid-like electrodes on at least one of the two substrate panels.

It is another further object of the present invention to provide a wide angle viewing fringe field multi-domain aligned LCD panel that includes a conductive grid of horizontal and vertical bars formed on a passivation layer and an electrically conductive layer on at least one of the two panel substrates.

It is still another object of the present invention to provide a wide viewing angle fringe field multi-domain aligned LCD panel that is vertically aligned with a liquid crystal material of negative dielectric anisotropy.

It is yet another object of the present invention to provide a wide viewing angle fringe field multi-domain aligned LCD panel with vertically aligned liquid crystal material of positive dielectric anisotropy.

It is still another object of the present invention to provide a method for fabricating a wide viewing angle fringe field multi-domain aligned LCD panel and vertically aligning the liquid crystal molecules to a negative dielectric anisotropy.

It is yet another further object of the present invention to provide a method for fabricating a wide viewing angle fringe field multi-domain aligned LCD panel by aligning the liquid crystal molecules vertically to a positive dielectric anisotropy.

SUMMARY OF THE INVENTION

In accordance with the present invention, wide viewing angle fringe field multi-domain vertically aligned LCD panel and a method for fabricating such LCD are disclosed.

In a preferred embodiment, a wide viewing angle fringe field multi-domain aligned LCD panel is provided which includes a first light transmissive substrate; an electrically conductive layer coated on an inside surface of the first light-transmissive substrate forming a first electrode. The layer is substantially optically transparent; a second light-transmissive substrate; and electrically conductive grid of horizontal and vertical bars coated on an inside surface of the first light-transmissive substrate forming a second electrode; a cavity formed between the two inside surfaces of the first and second light-transmissive substrates and a peripheral seal when the two substrates are positioned juxtaposed to each other in a spaced-apart relationship; and a liquid crystal material filling the cavity.

In the wide viewing angle fringe field multi-domain aligned LCD panel, the electrically conductive grid may be formed of an electrically conductive metal, or formed of Cr, Mo or MoCr or formed of an optically transparent electrode material such as indium-tin-oxide (ITO). The liquid crystal material may have molecules that are vertically aligned, or may have a negative dielectric anisotropy, or may have a positive dielectric anisotropy.

The present invention is further directed to a wide viewing angle fringe field multi domain aligned LCD panel that includes a first light-transmissive substrate; a first electrically conductive grid of horizontal and vertical bars coated on an inside surface of the first light-transmissive substrate forming a first electrode; a second light-transmissive substrate; a second electrically conductive grid of horizontal and vertical bars coated on an inside surface of the first light-transmissive substrate forming a second electrode; a cavity formed between the two inside surfaces of the first and second light-transmissive substrates and a peripheral seal when the two substrates are positioned juxtaposed to each other in a spaced-apart relationship; and a liquid crystal having a negative dielectric anisotropy filling the cavity.

In the wide viewing angle fringe field multi-domain aligned LCD panel, the first and second electrically conductive grids may be formed of an electrically conductive metal or may be formed of optically transparent electrode material. The first electrically conductive grid may be formed of metal and the second electrically conductive grid may be formed of an optically transparent electrode material. The first and second electrically conductive grids may be formed of horizontal and vertical bars each having a width between 2 $\mu$m and about 20 $\mu$m, and a distance between the bars of between about 10 $\mu$m and about 50 $\mu$m. The first and second electrically conductive grids may be formed of horizontal and vertical bars each having a width/pitch ratio between about 1/10 and about 1.

The present invention is further directed to a method for fabricating a wide viewing angle fringe field multi domain aligned LCD panel which includes the operating stops of providing a first light-transmissive substrate; coating an electrically conductive layer on an inside surface of the first light-transmissive substrate forming a first electrode, the layer may be substantially optically transparent; providing a second light-transmissive substrate; coating an electrically conductive grid of horizontal and vertical bars on an inside surface of the first light-transmissive substrate to form a second electrode; forming a cavity between the two inside surfaces of the first and second light-transmissive substrates and a peripheral seal by positioning the two substrates juxtaposed to each other in a spaced-apart relationship; and filling a liquid crystal material into the cavity.

The method for fabricating a wide viewing angle fringe field multi-domain aligned LCD panel may further include the step of forming the electrically conductive grid in an electrically conductive metal, or the step of forming the electrically conductive grid in Cr, Mo or MoCr. The method may further included the step of forming said electrically conductive grid in indium-tin-oxide, or the step of coating the electrically conductive layer in a grid of horizontal and vertical bars formed of metal, and filling the liquid crystal material that has a negative dielectric anistropy into the cavity. The method may further include the step of filling the liquid crystal material that is vertically aligned into the cavity.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a wide viewing angle fringe field multi-domain vertically aligned LCD panel and a method for fabricating the panel.

The present invention is constructed with a first light-transmissive substrate; an electrically conductive layer coated on an inside surface of the first light transmissive substrate, such as a glass substrate to form a first electrode, the layer may be substantially optically transparent such as an indium-tin-oxide material; a second light-transmissive substrate such as a glass substrate; and electrically conductive grid formed of horizontal, and vertical bars on an insulating layer, such as a passivation layer. The passivation layer is deposited on an electrically conductive layer such as ITO which is in turn deposited on a first light-transmissive substrate to form a second electrode. The TCD panel further includes a cavity that is formed between the two inside surfaces of the first and second light-transmissive substrates and a peripheral seal when the two substrates are positioned juxtaposed to each other in a spaced-apart relationship, and a liquid crystal material that can be vertically aligned filling the cavity.

The electrically conductive layer coated on the passivation layer may be an electrically conductive grid of rectangular shape formed by horizontal and vertical bars. The electrically conductive grid may be formed of either a conductive metal or a substantially transparent conductive layer such as indium-tin-oxide.

The present invention wide viewing angle fringe field multi-domain aligned LCD panel can be advantageously fabricated by existing TFT fabrication techniques for producing the electrodes. The invention utilizes liquid crystal materials that can be vertically aligned in either a positive dielectric anisotropy or in a negative dielectric anisotropy. A symmetrical multi-domain liquid crystal display cell can thus be fabricated.

Figure 4:
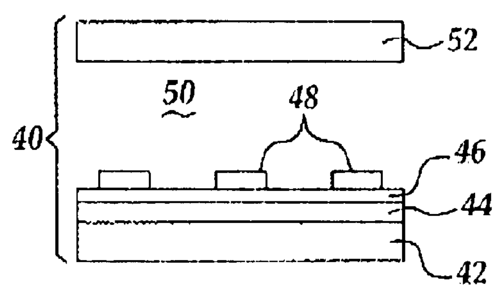
FIG. 4 is an enlarged, cross-sectional view of a present invention LCD cell equipped with a grid-like electrode.
Figure 5:
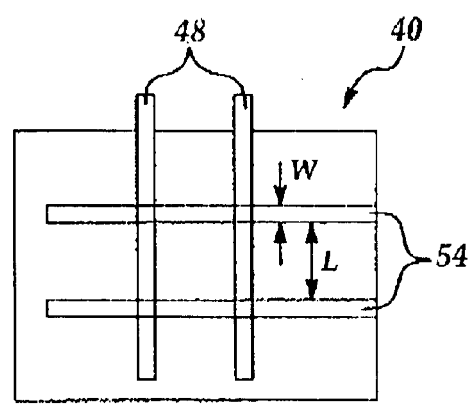
FIG. 5 is a plane view of the present invention structure of FIG. 4 illustrating the grid-like electrode.

An enlarged, cross-sectional view of a present invention fringe field multi-domain aligned LCD cell 40 is shown in FIG. 4. A plane view of the multi-domain LCD cell 40 is shown in FIG. 5. As shown in FIG. 4, the present invention multi-domain LCD cell 40 is constructed by a first light-transmissive substrate, i.e. such as a glass substrate 42, onto which a layer of an optically transparent electrode 44, such as an indium-tin-oxide layer is first deposited. On top of the ITO layer 44, is then formed a passivation layer 46 from an insulating material such as silicon oxide, silicon nitride, etc. The ITO layer 44 functions as a common electrode, while the metal layer 48 formed in a grid configuration by horizontal and vertical bars. For instance, the metal layer 48 shown in FIG. 4 may be a M2 (Metal-2) layer that is connected to data pixel. Into the cavity 50 formed between the first glass substrate 42 and the second glass substrate 52 is then filled a liquid crystal material such as one that is vertically aligned. The fringe field multi-domain aligned LCD cell 40 shown in FIG. 4 further includes two polarizer layers (not shown) with one on each of the glass substrates 42,52. The polarizer layers are well-known in the art and thus will not be further elaborated.

In a corresponding plane view of the fringe field multi-domain aligned LCD cell 40, shown in FIG. 5, the grid pattern of the metal electrode 48 is shown. The horizontal metal bars 54 are also shown in this plane view. The LCD cell 40 may be vertically aligned by using a liquid crystal material that has a positive dielectric anisotropy, i.e. where the dielectric constant $\Delta E>0$, in order to form a multi-domain symmetrical array of liquid crystal cells. Similarly, the present invention fringe field multi-domain LCD cell may also use vertically aligned liquid crystal material that has a negative dielectric anisotropy.

Figure 1A:
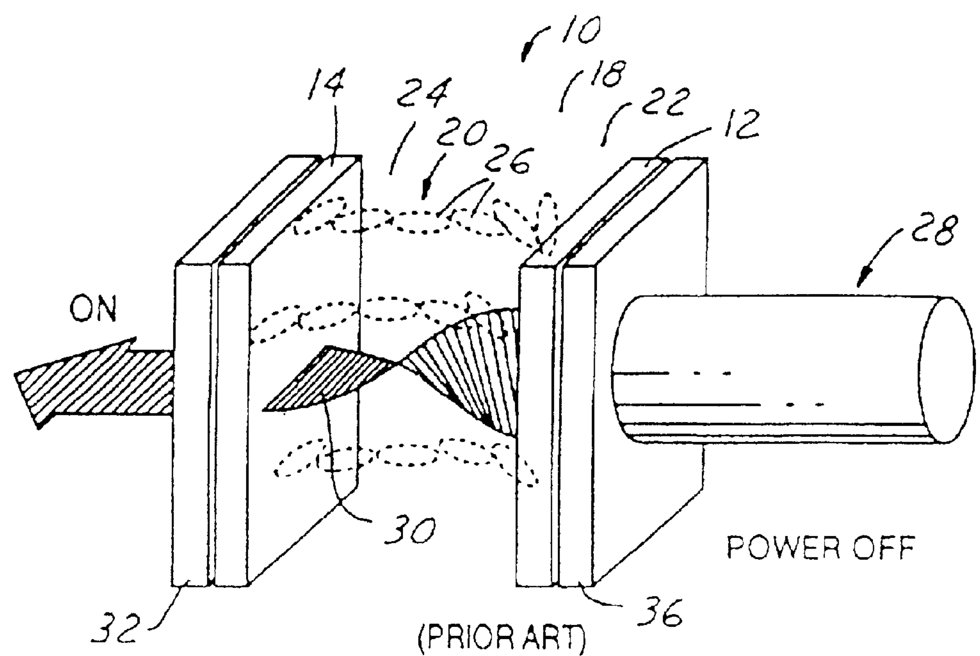
FIGS. 1A and 1B are graphical illustration of a conventional twisted nematic liquid crystal display cell with a voltage turned off or turned on, respectively.
Figure 1B:
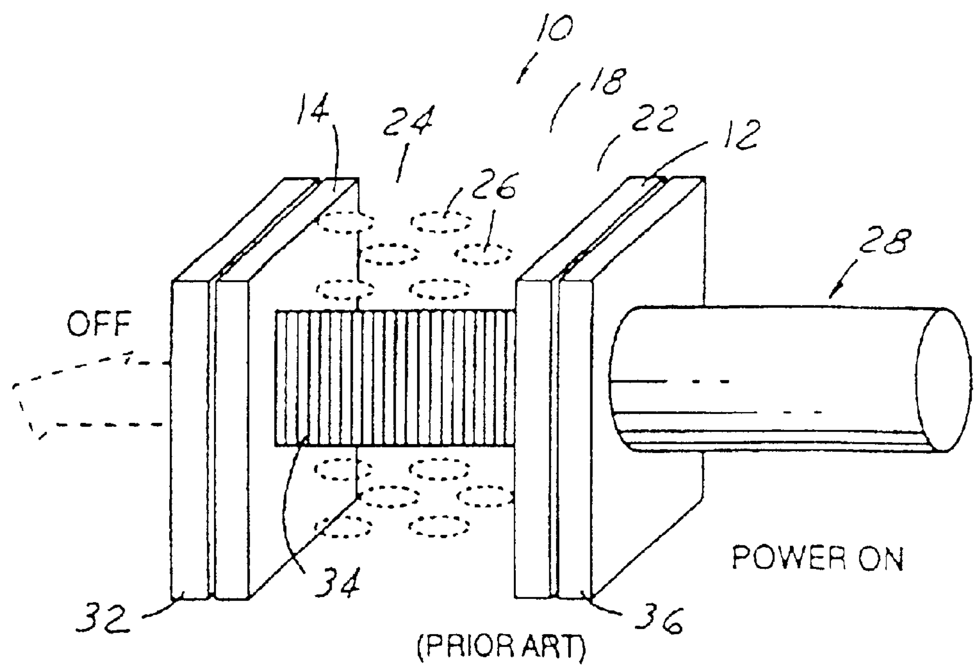
Figure 2A:
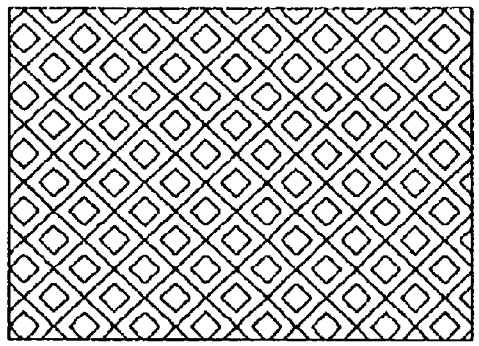
FIG. 2A is a graph illustrating the present invention liquid crystal display panel wherein the liquid crystal material has a positive dielectric anisotropy.
Figure 2B:
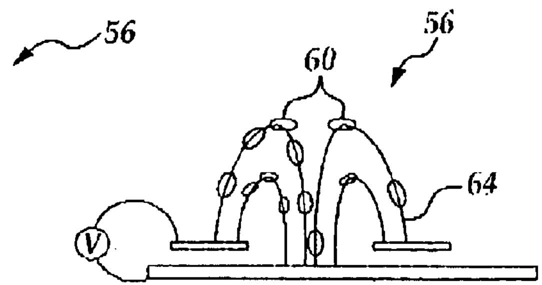
FIG. 2B is a graph illustrating the present invention liquid crystal material of the positive dielectric anisotropy type being aligned by a grid-like electrode.
Figure 3A:
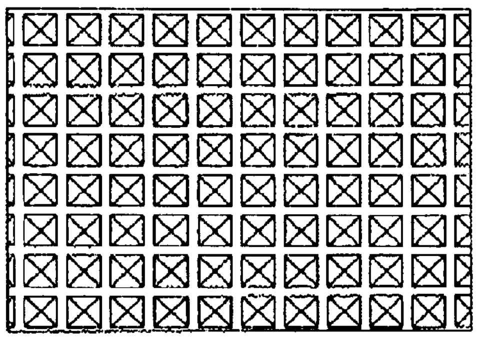
FIG. 3A is a graph illustrating the present invention liquid crystal display panel having a liquid crystal material therein of the negative dielectric anisotropy.
Figure 3B:
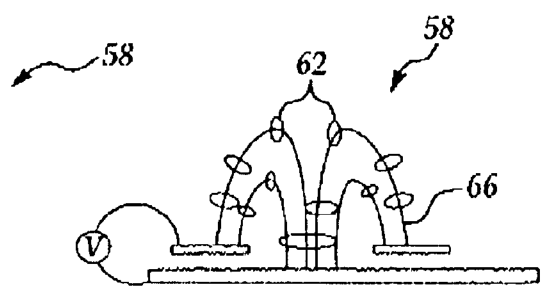
FIG. 3B is a graph illustrating the present invention liquid crystal cell of the negative dielectric anisotropy type being aligned by a grid-like electrode.

The liquid crystal material that has a positive dielectric anisotropy is shown in FIG. 2A in a plane view and in FIG. 2B in an enlarged, cross-sectional view for structure 56. A present invention fringe field multi-domain liquid crystal cell that has vertically aligned liquid crystal material is shown in FIG. 3A in a plane view and in FIG. 3B in an enlarged, cross-sectional view for structure 58. It is seen that, in the positive dielectric anisotropy material, shown in FIG. 2B, the liquid crystals 60 are aligned with the equipotential lines 64. In the liquid crystal cell 58 that has the negative dielectric anisotropy, liquid crystals 62 are aligned perpendicular to the equipotential lines 66. The plane views of the structures 56,58 shown in FIGS. 2A and 3A are obtained in an activated state.

The present invention metal electrode layers 48,54, as shown in FIG. 5, may be arranged in a rectangular configuration or in a square configuration. The width of the metal lines 48, 54 may be suitably selected between about 2 μm and about 20 μm and preferably between about 5 μm and about 10 μm. The pitch, or the distance between the horizontal lines 54, or between the vertical lines 48, is between about 10 μm and about 100 μm, and preferably between about 20 μm and about 30 μm. In a preferred embodiment of the present invention fringe field multi-domain aligned LCD cell, the width/pitch ratio for the cell equipped with a metal grid electrode is between about 1/10 and about 1, and preferably about 1/5. A vertical alignment layer can be coated on the first and the second substrates 42,52 and after the two substrates are assembled together, a gap between about 5 μm and about 10 μm is obtained for the liquid crystal cell 40.

The cavity 50, shown in FIG. 4, may be filled with a liquid crystal material that has either a positive dielectric anisotropy or a negative dielectric anisotropy. The present invention novel structure LCD cell 40 produces improved wide viewing angle and superior color and image definition. When no voltage is applied to the liquid crystal cell 40, the liquid crystal molecules 60,62, are vertically aligned, and therefore under cross polarizers appears black through the cell 40. When a bias voltage is applied to the electrodes 48,54, an electric field is created to orient the liquid crystal molecules 60,62. Due to the structure of the electric field and the equipotential lines formed, the transmittance patterns are different for different orientations of the cross polarizers.

The present invention novel liquid crystal cell structure presents numerous processing advantages. Not only that the fabrication process is compatible with a standard TFT (thin film transistor) fabrication process, the present invention novel structure saves the additional fabrication steps for forming the electrodes used for the color filter in a LCD panel when the multi-domain LCD panel is fabricated. Moreover, the formation process by etching of the metal lines in the electrode grid can be more easily carried out than an etching process for the indium-tin-oxide layer. A larger process window is available for the metal line etching process. The present invention novel structure has improved contrast since the darkened state of the liquid crystal cell is darker due to the vertical alignment. The present invention novel structure further presents the benefit that no rubbing process is necessary.

Other beneficial characteristics can also be achieved by the present invention novel structure. The viewing angle is widened with lesser color scattering due to the symmetrical array of the multi-domain structure. Moreover, the aperture ratio can be increased due to the use of an insulating material layer between the two electrode layers. A storage capacitor Cs can be naturally formed by the structure. Due to the formation of the large storage capacitor Cs, the selection of the liquid crystal material becomes more flexible such that high dielectric constant and low LC resistance and—CN containing liquid crystal materials can be utilized.

Figure 6:
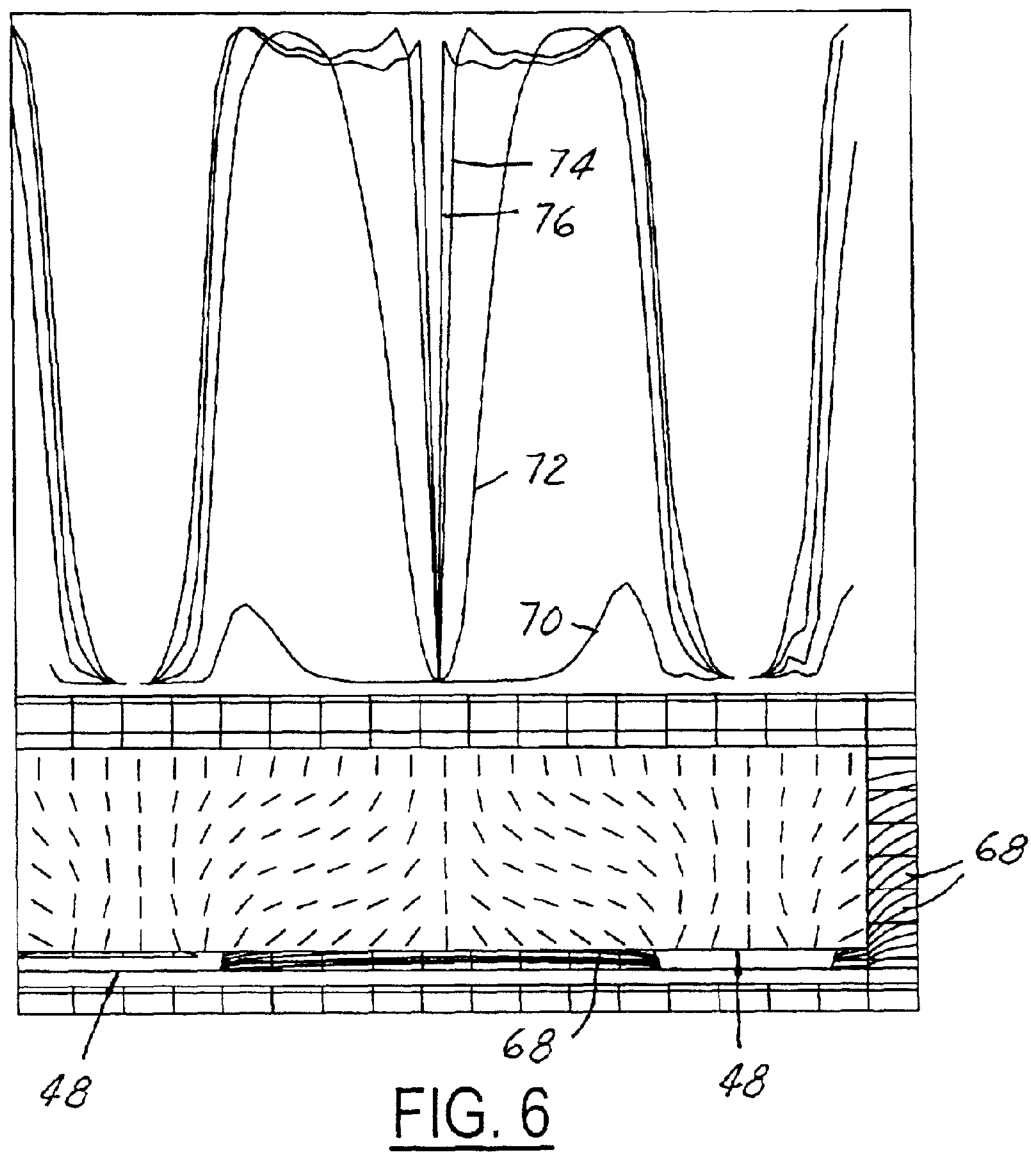
FIG. 6 is a graph illustrating the dependency of percent transmission across a LCD cell at various electric field strength.

FIG. 6 is a graph illustrating the dependence of percent light transmission on the locations of the liquid crystal cell equipped with the present invention metal grid electrode. The graph clearly shows the multi-domain formed in the present invention liquid crystal cell under an electric field. The lines 68 are the equipotential lines formed between the vertical lines 48, while line 70 indicates the electrode position. Similarly, the electrode position is also shown by line 72 obtained at 3.00 ms, line 74 obtained at 5.00 ms, and line 76 obtained at 10.00 ms. It is noted that above the 3 ms value, the percent transmission is saturated and therefore presents little changes.

Figure 7:
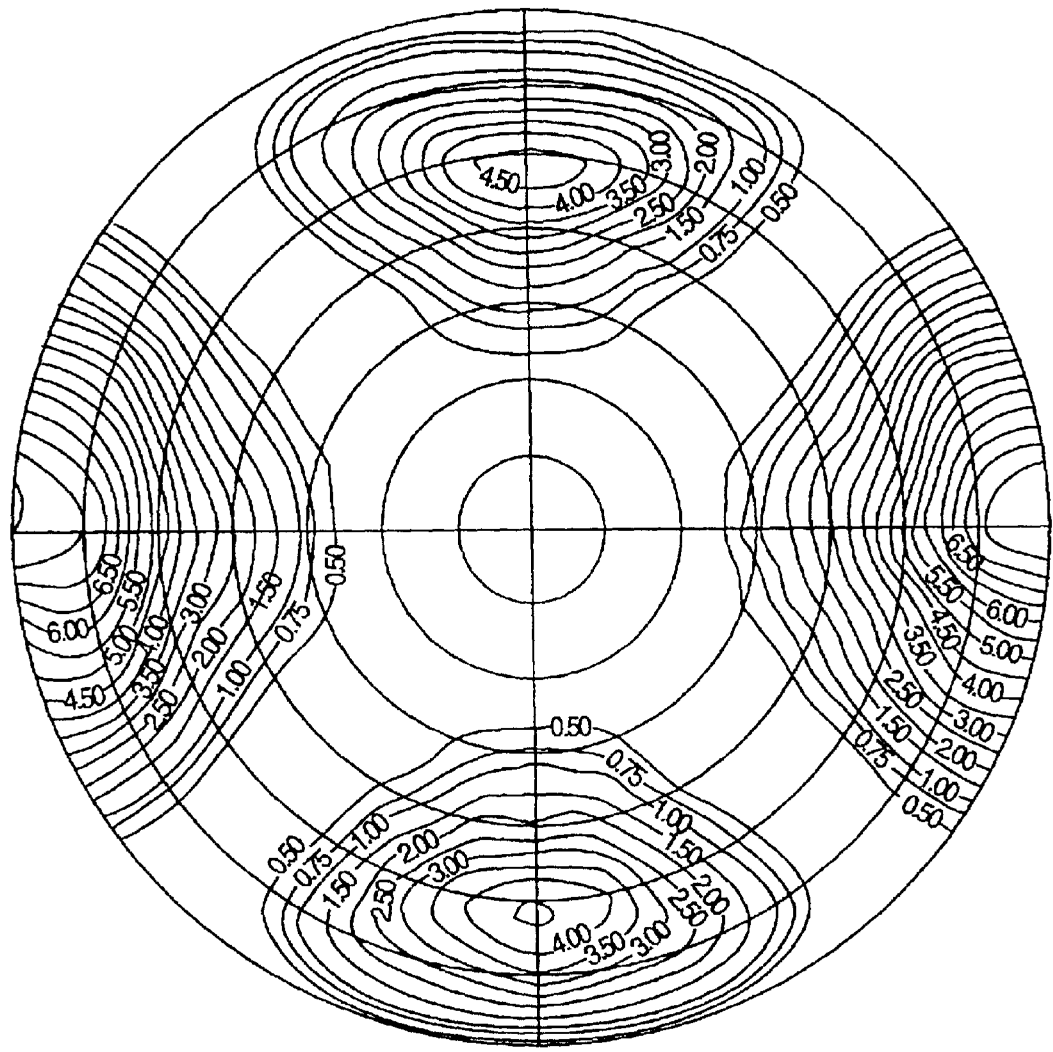
FIG. 7 is a graph illustrating equipotential lines of an electric field at 0 V.
Figure 8:
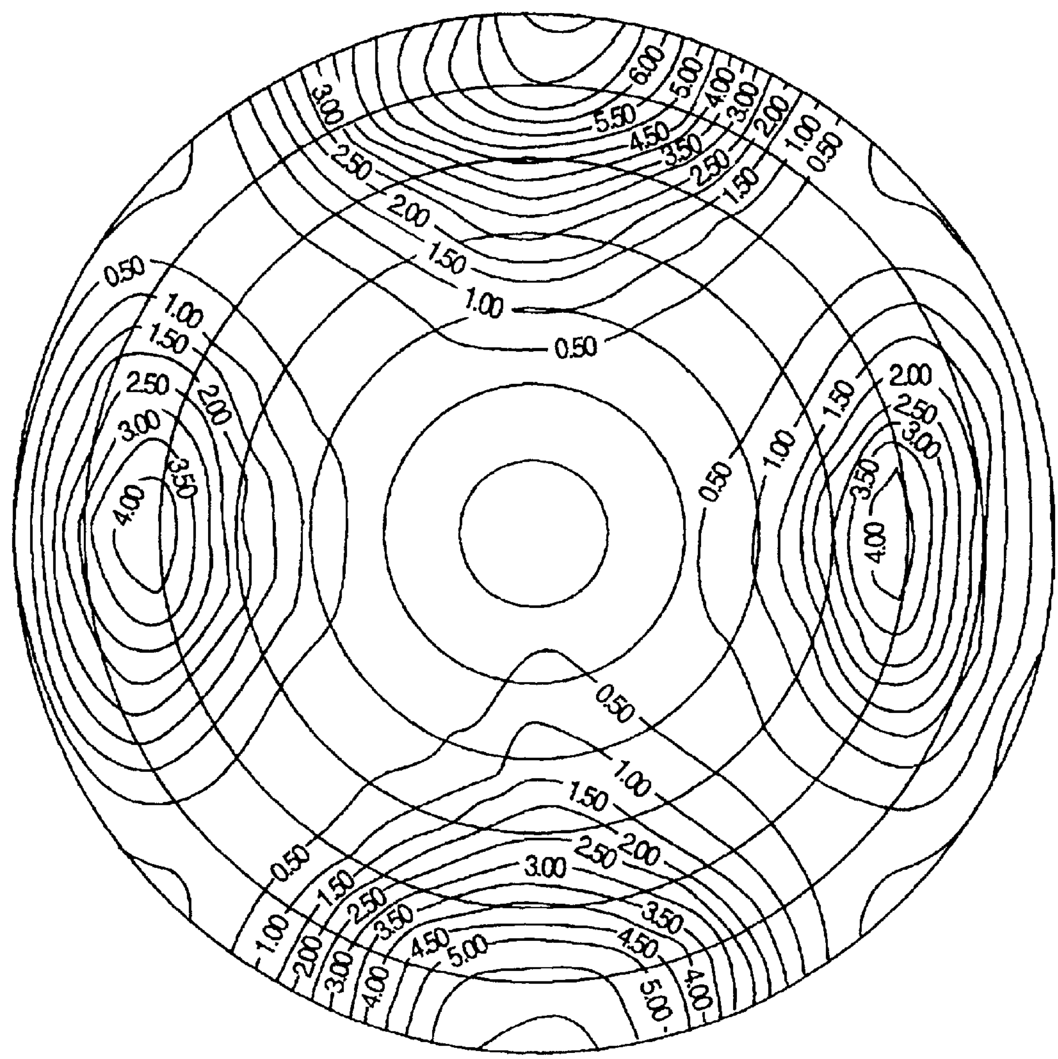
FIG. 8 is a graph illustrating equipotential lines of an electric field at 4 V.
Figure 9:
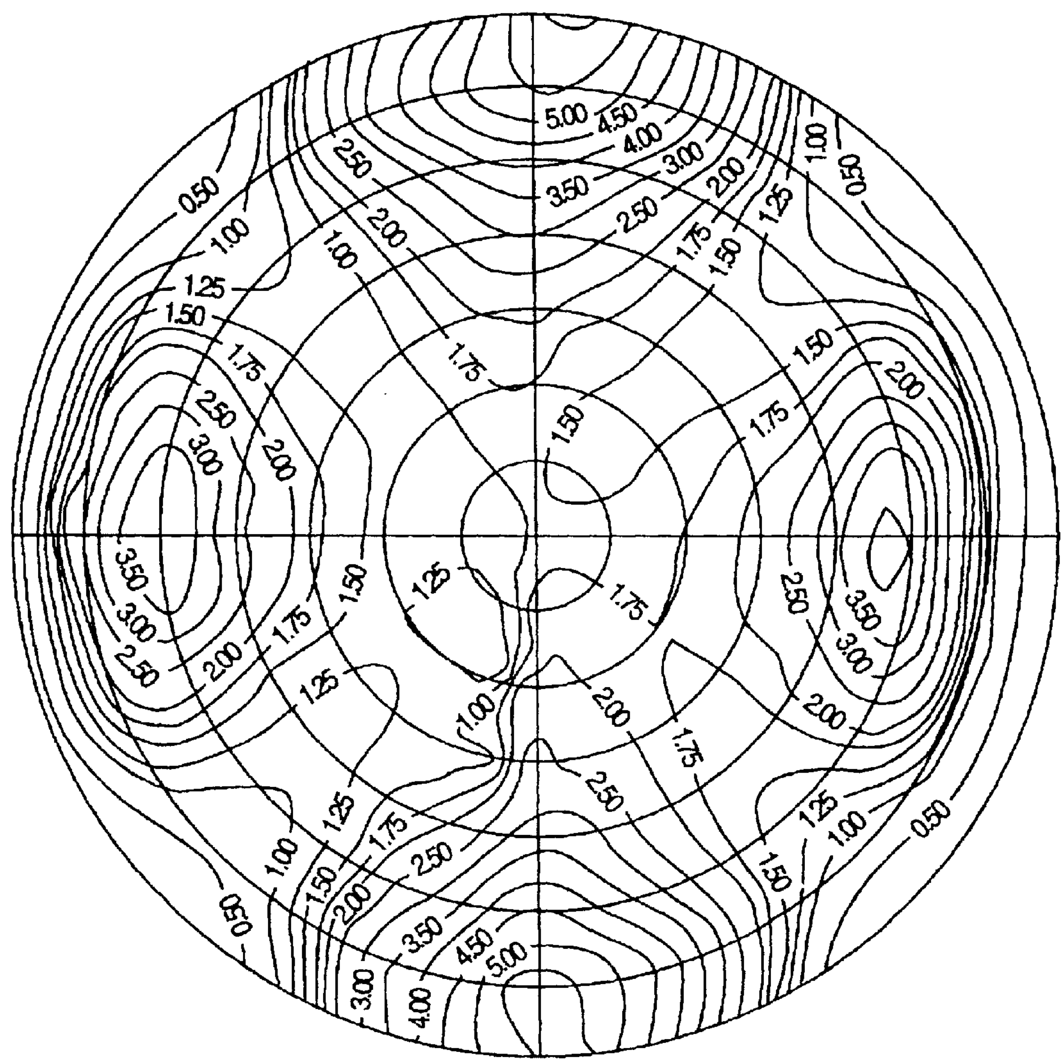
FIG. 9 is a graph illustrating equipotential lines of an electric field at 15 V.

FIGS. 7, 8 and 9 shows equipotential lines for the present invention fringe field multi-domain aligned LCD cell when different voltages are applied. For instance, FIG. 7 shows a diagram when no voltage is applied, FIG. 8 shows a diagram when 4 V is applied, while FIG. 9 shows a diagram when 15 V is applied. It is seen that as the voltage applied becomes higher, a more uniform distribution of the equipotential lines is realized, with the best distribution shown in FIG. 9 at 15 V. The effectiveness of the present invention fringe field multi-domain vertically aligned LCD cell is therefore clearly demonstrated by FIGS. 7, 8 and 9.

The present invention novel wide viewing angle fringe field multi-domain aligned LCD panel and a method for fabricating such panel have therefore been amply described in the above description and in the appended drawings of FIGS. 2A–9.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A wide viewing angle fringe field multi-domain aligned LCD panel comprising:

a first light-transmissive substrate;

a first electrically conductive grid of horizontal and vertical bars coated on an inside surface of said first light-transmissive substrate forming a first electrode;

a second light-transmissive substrate;

a second electrically conductive grid of horizontal and vertical bars coated on an inside surface of said second light-transmissive substrate forming a second electrode;

said first and second electrically conductive grids being formed of horizontal and vertical bars each having a width between 2 μm and about 20 μm, and a distance between bars between about 10 μm and about 50 μm;

a cavity formed between said two inside surfaces of said first and second light-transmissive substrates and a peripheral seal when said two substrates are positioned juxtaposed to each other in a spaced-apart relationship; and a liquid crystal having a negative dielectric anisotropy filling said cavity.

2. A wide viewing angle fringe field multi-domain aligned LCD panel according to claim 1, wherein said liquid crystal material having molecules that are vertically aligned.

3. A wide viewing angle fringe field multi-domain aligned LCD panel according to claim 1, wherein said first and second electrically conductive grids being formed of an electrically conductive metal.

4. A wide viewing angle fringe field multi-domain aligned LCD panel according to claim 1, wherein said first and second electrically conductive grids being formed of an optically transparent electrode material.

5. A wide viewing angle fringe field multi-domain aligned LCD panel according to claim 1, wherein said first electrically conductive grid being formed of metal and said second electrically conductive grid being formed of an optically transparent electrode material.

6. A wide viewing angle fringe field multi-domain aligned LCD panel according to claim 1, wherein said first and second electrically conductive grids being formed of horizontal and vertical bars each having a width/pitch ratio between about 1/10 and about 1.

* * * * *